(12) United States Patent
Connor et al.

(10) Patent No.: US 7,142,196 B1
(45) Date of Patent: Nov. 28, 2006

(54) GEOGRAPHICAL DATA MARKUP ON A PERSONAL DIGITAL ASSISTANT (PDA)

(75) Inventors: Edward J. Connor, Fairfax, CA (US); Nemmara Chithambaram, Novato, CA (US); John Ricardo DeAguiar, Sebastopol, CA (US)

(73) Assignee: Autodesk, Inc., San Rafael, CA (US)

( * ) Notice: Subject to any disclaimer, the term of this patent is extended or adjusted under 35 U.S.C. 154(b) by 1213 days.

(21) Appl. No.: 09/628,851

(22) Filed: Jul. 31, 2000

Related U.S. Application Data

(60) Provisional application No. 60/159,069, filed on Oct. 12, 1999, provisional application No. 60/193,141, filed on Mar. 29, 2000, provisional application No. 60/193,153, filed on Mar. 29, 2000, provisional application No. 60/193,142, filed on Mar. 29, 2000, provisional application No. 60/193,862, filed on Mar. 30, 2000.

(51) Int. Cl.
G09G 5/00 (2006.01)

(52) U.S. Cl. ...................... 345/173; 345/174; 345/175; 345/176; 345/177

(58) Field of Classification Search ........ 345/173–178, 345/121, 146, 145, 347, 328–356, 125, 760; 701/200–208, 213; 717/175; 715/511, 512, 715/760, 733, 827; 713/100, 201; 709/236, 709/219; 725/110; 719/318, 236; 84/219
See application file for complete search history.

(56) References Cited

U.S. PATENT DOCUMENTS

| 5,231,584 A | 7/1993 | Nimura et al. |
| 5,528,248 A | 6/1996 | Steiner et al. |
| 5,543,789 A | 8/1996 | Behr et al. |
| 5,559,707 A | 9/1996 | DeLorme et al. |
| 5,564,005 A * | 10/1996 | Weber et al. ............... 715/863 |
| 5,673,421 A | 9/1997 | Shirakawa |
| 5,687,254 A * | 11/1997 | Poon et al. ................. 382/229 |
| 5,689,431 A | 11/1997 | Rudow |
| 5,699,244 A | 12/1997 | Clark, Jr. et al. |
| 5,727,159 A | 3/1998 | Kikinis |
| 5,848,040 A * | 12/1998 | Tanaka ..................... 369/47.35 |
| 5,848,373 A * | 12/1998 | DeLorme et al. ........... 701/200 |
| 5,938,721 A | 8/1999 | Dussell et al. |

(Continued)

FOREIGN PATENT DOCUMENTS

WO    WO 97/07467    2/1997

OTHER PUBLICATIONS

ARGU95, Argus User's Guide 3.0, The Next Generation in GIS, Munro Garrett International, May 1994, pp. 176-180.

(Continued)

*Primary Examiner*—Bipin Shalwala
*Assistant Examiner*—Prabodh Dharia
(74) *Attorney, Agent, or Firm*—Gates & Cooper LLP

(57) ABSTRACT

A method, system, and article of manufacture provide the ability to redline or mark up geographic information on a personal digital assistant (PDA). An application on the PDA is configured to obtain map data from a server and display the map data on a screen of the PDA. Markup data is obtained from a user through a stylus that is used to markup the map displayed on the PDA. A file comprised of the markup data is created and then uploaded from the PDA to the server. Accordingly, the markup data comprises a markup layer that is stored locally on the PDA and uploaded (synchronized) with the server automatically when a list of a set of maps is updated.

62 Claims, 7 Drawing Sheets

U.S. PATENT DOCUMENTS

| | | | |
|---|---|---|---|
| 5,966,135 | A | 10/1999 | Roy et al. |
| 5,973,678 | A | 10/1999 | Stewart et al. |
| 5,974,431 | A | 10/1999 | Iida |
| 5,995,101 | A * | 11/1999 | Clark et al. ............... 345/711 |
| 6,040,824 | A * | 3/2000 | Maekawa et al. ........... 345/173 |
| 6,057,854 | A | 5/2000 | Davis, Jr. et al. |
| 6,124,858 | A | 9/2000 | Ge |
| 6,156,965 | A * | 12/2000 | Shinsky ...................... 84/650 |
| 6,166,734 | A * | 12/2000 | Nahi et al. .................. 345/748 |
| 6,182,010 | B1 | 1/2001 | Berstis |
| 6,192,518 | B1 * | 2/2001 | Neal ........................... 717/175 |
| 6,240,555 | B1 * | 5/2001 | Shoff et al. ................. 725/110 |
| 6,253,326 | B1 * | 6/2001 | Lincke et al. ............... 713/201 |
| 6,321,158 | B1 * | 11/2001 | DeLorme et al. ........... 701/201 |
| 6,336,072 | B1 * | 1/2002 | Takayama et al. .......... 701/200 |
| 6,337,693 | B1 | 1/2002 | Roy et al. |
| 6,343,290 | B1 | 1/2002 | Cossins et al. |
| 6,359,633 | B1 * | 3/2002 | Balasubramaniam et al. ........................... 715/760 |
| 6,370,449 | B1 | 4/2002 | Razavi et al. |
| 6,397,259 | B1 * | 5/2002 | Lincke et al. ............... 709/236 |
| 6,421,453 | B1 * | 7/2002 | Kanevsky et al. ........... 382/115 |
| 6,456,938 | B1 * | 9/2002 | Barnard ....................... 701/213 |
| 6,477,575 | B1 | 11/2002 | Koeppel et al. |
| 6,505,242 | B1 | 1/2003 | Holland et al. |
| 6,535,743 | B1 * | 3/2003 | Kennedy et al. ......... 455/456.1 |
| 6,542,813 | B1 | 4/2003 | Kovacs |
| 6,551,357 | B1 * | 4/2003 | Madduri ...................... 715/512 |
| 6,560,620 | B1 * | 5/2003 | Ching ......................... 715/511 |
| 6,604,046 | B1 * | 8/2003 | Van Watermulen et al. 701/208 |
| 6,654,683 | B1 | 11/2003 | Jin et al. |
| 6,665,824 | B1 * | 12/2003 | Ruhlen et al. ................ 714/57 |
| 6,674,445 | B1 * | 1/2004 | Chithambaram et al. ... 345/619 |
| 6,687,876 | B1 | 2/2004 | Schilit et al. |
| 6,724,382 | B1 * | 4/2004 | Kenyon et al. ............. 345/419 |
| 6,725,281 | B1 * | 4/2004 | Zintel et al. ................. 719/318 |
| 6,763,458 | B1 * | 7/2004 | Watanabe et al. ........... 713/100 |
| 6,769,019 | B1 * | 7/2004 | Ferguson .................... 709/219 |
| 6,886,170 | B1 * | 4/2005 | Bahrs et al. ................. 719/318 |
| 2002/0085032 | A1 * | 7/2002 | Fong et al. ................. 345/760 |
| 2002/0128903 | A1 | 9/2002 | Kernahan |
| 2003/0035003 | A1 * | 2/2003 | Marcos et al. .............. 345/760 |
| 2004/0237049 | A1 * | 11/2004 | Pletcher et al. ............. 715/760 |
| 2005/0216863 | A1 * | 9/2005 | Schumacher et al. ....... 715/827 |
| 2006/0129937 | A1 * | 6/2006 | Shafron ...................... 715/733 |
| 2006/0184887 | A1 * | 8/2006 | Popp et al. ................. 715/760 |

OTHER PUBLICATIONS

SOFT95, Specification for the Simple Vector Format (SVF) v1.1, article, SoftSource, Bellingham, Washington, 1995, pp. 1-8.

XERO95, Map Viewer Technical Details, Xerox Corporation, Jun. 2, 1995, 3 pp.

XERO95, Mapwriter (1) User Commands, Xerox Corporation Nov. 5, 1993, 4 pp.

XERO95, About the Xerox PARC Map Viewer, Xerox Corporation, Jun. 1993, 1 pp.

M. Potmesil, "Maps Alive: Viewing Geospatial Information on the WWW," Computer Networks and ISDN Systems, 1997, 29: 1327-1342.

International Business Machines Corporation. "Markup File for Asynchronized Collaboration on an Image Viewer Application". Research Disclosure Datebase No. 418093, Research Disclosure Journal, ISSN 0374-4353 Kenneth Mason Publications Ltd, Feb. 1999.

Reilly, Rob. "Desktop Video-Conferencing with George Jetson," MultiMedia Schools, p. 78-79, Nov./Dec. 2000.

Microsoft NetMeeting Features. Updated Jun. 2, 1999 http://web.archive.org/web/19991013123712/microsoft.com/windows/NetMeeting/Features/Whiteboard/default.asp.

Microsoft NetMeeting Features. Updated Jun. 7, 1999. http://web.archive.org/web/19991013143705/http://microsoft.com/windows/NetMeeting/Features/default.asp.

Microsoft Corporation. "Resource Kit Copyright Information." Updated Dec. 15, 1999. http://www.microsoft.com/windows/NetMeeting/Corp/reskit/Copyright/default.asp.

"Welcome to Netmeeting 3". Updated Dec. 20, 2000. http://www.microsoft.com/windows/NetMeeting/Corp/reskit/Welcome/default.asp.

"NetMeeting 3.0" Updated Jul. 4, 2004. http://www.meetingbywire.com/NetMeeting3.htm.

"eZ Questions & Answers." Apr. 1, 2001 http://web.archive.org/web/20010405200856/www.ezmeeting.com/Q$_{13}$A.html.

Windows NetMeeting Features. Updated Apr. 22, 2004. http://www.microsoft.com/windows/NetMeeting/Features/default.ASP.

* cited by examiner

GEOGRAPHICAL DATA MARKUP ON A PERSONAL DIGITAL ASSISTANT (PDA)

CROSS-REFERENCE TO RELATED APPLICATIONS

This application claims the benefit under 35 U.S.C. §119 (e) of the following co-pending and commonly assigned U.S. Provisional patent applications, which applications are incorporated by reference herein:

U.S. application Ser. No. 60/159,069, entitled "MAPGUIDE PERSONAL DIGITAL ASSISTANT," filed on Oct. 12, 1999, by Nemmara Chithambaram, et. al.;

U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al.;

U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al.;

U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al.; and U.S. application Ser. No. 60/193,862, entitled "MAPGUIDE FOR MOBILE DEVICES SERVER," filed on Mar. 30, 2000, by Nemmara Chithambaram, et. al.

This application is related to the following co-pending and commonly-assigned patent applications, which applications are incorporated by reference herein:

U.S. patent application Ser. No. 09/411,506, entitled "VECTOR-BASED GEOGRAPHIC DATA", by Gregory A. Roy, et. al., filed on Oct. 4, 1999, which is a continuation patent application of U.S. Pat. No. 5,966,135 issued on Oct. 12, 1999 (application Ser. No. 08/757,706 filed on Oct. 30, 1996), by Gregory A. Roy et al., entitled "VECTOR-BASED GEOGRAPHIC DATA";

U.S. patent application Ser. No. 09/629,115, entitled "METHOD AND APPARATUS FOR PROVIDING ACCESS TO MAPS ON A PERSONAL DIGITAL ASSISTANT (PDA)", by Nemmara Chithambaram et al., filed on the same date herewith;

U.S. patent application Ser. No. 09/628,850, entitled "GENERALIZED, DIFFERENTIALLY ENCODED, INDEXED RASTER VECTOR DATA AND SCHEMA FOR MAPS ON A PERSONAL DIGITAL ASSISTANT", by Nemmara Chithambaram et al., filed on the same date herewith; and U.S. patent application Ser. No. 09/629,117, entitled "METHOD AND APPARATUS FOR OBTAINING A SET OF MAPS", by Nemmara Chithambaram et al., filed on the same date herewith.

BACKGROUND OF THE INVENTION

1. Field of the Invention

The present invention relates generally to electronic maps and geographic information, and in particular, to a method, apparatus, and article of manufacture for marking up and redlining maps and geographic data on a personal digital assistant (PDA).

2. Description of the Related Art

Computer implemented geographic information systems (GIS) are known in the art. Such GIS provide for the retrieval and display of geographic information (e.g., maps). Additionally, the ability to redline or mark up an architectural drawing is known in the art. Such redlining capabilities allow a user to superimpose or draw a shape, text, or other information on an existing drawing. However, the use of a GIS on a personal digital assistant (PDA) and marking up or redlining a map displayed on a PDA are not known or disclosed in the art.

Field/utility technicians such as gas company employees, salespersons, plumbers, insurance adjusters, or any type of employment that requires travel to different locations, often utilize or require access to maps and geographic information. Further, such technicians often need to interact with and markup or redline a map to refer to at a later time. For example, a plumber/contractor may want to determine where the main gas line or water line on a street is located. Additionally, if the main gas line or water line is not in the location specified in the map (or such data is not available), the plumber/contractor may want to markup the map to indicate where the gas line or water line is located. While out in the field, the technicians often do not have a network connection, and carrying a laptop or desktop computer is cumbersome and impractical. Thus, it is desirable to have a small (handheld) portable computing device with the capabilities to display, interact, and markup geographic information both online and offline.

Prior art handheld computing devices (also referred to as palm PCs or personal digital assistants (PDAs)), are often used to access and utilize personal information. Many handheld computing devices are available in today's marketplace. Typically, handheld computing devices are only slightly larger than the size of one's palm (hence, the name palm PC) and have a small display screen for viewing a plethora of items. Software can be installed on a PDA to provide enhanced functionality. For example, a personal productivity tool may be installed to provide access to a calendar, contacts, email, Internet browsing, audio books, and audio recording capabilities. Card slots may also be available to provide additional memory or other functions (e.g. a modem). Additionally, some PDAs have infrared (IR) ports for communication.

The PDA environment, however, poses several challenges for geographic information systems and markup/redlining in terms of memory, storage, processor speeds, wireless transmission rates, and display attributes. For example, PDAs commonly only maintain 96K or less of memory, 2 Mb (megabytes) or less storage, a 13 MHz processor speed, and a black and white or gray scale display mechanism. Displaying a map and maintaining the ability to redline or markup a map on a PDA must be within such limitations.

Thus, there is a need for a geographic information system that overcomes the above described deficiencies on a portable handheld electronic device such as a PDA.

SUMMARY OF THE INVENTION

One or more embodiments of the invention provide for redlining or marking up geographic information on a personal digital assistant (PDA). Embodiments include the ability to synchronize markup data on a PDA with a server and the graphical user interface for creating markup data. The PDA maintains the functionality commonly available in a standard client comprised of a complete computer system. The PDA provides uploadable, sharable redlining data (created from scribbles on the field).

PDA clients can markup the map data that is downloaded with each mapset. The markup graphics elements include a redline and a text note. The redline is a zero width vector that mimics ink flowing from a stylus, and an associated text note that pops up as a tooltip when the object is selected. The text note provides text blocks, represented on the map as note symbols anchored at a point, and an associated text note that pops up as a tooltip when the object is selected. Any number of these objects can be included in the markup layer of a specific mapset. Each mapset references a single markup layer.

Markup layers are stored locally and uploaded (synchronized) with the server automatically when the mapset list is updated. The markup layer, being a component of the mapset's data cache, either remains on the client or is purged with the mapset. If the mapset and associated markup layer stay on the client, subsequent edits may be made to it. These edits are copied up to the server at the next synchronization. Once a mapset leaves the PDA device, markup objects leave with it. When the map is accessed again, the note or redline object may or may not be with it, depending on how this map is handled on the server.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One of more embodiments of the invention provide for redlining and markup capabilities on a geographical information system (GIS) implemented on a personal digital assistant (PDA). Software on the PDA is enabled to provide such functionality. PDA users (e.g., technicians) can make scribbles and annotations on a map displayed on a PDA using a paper and pencil metaphor. To accommodate such redlining, embodiments provide a redline object that consists of geometric scribbles (points, lines, polygons, symbols), GPS (global positioning system) input coordinates, annotations (positioned text with font information, etc.), and a georeference system that allows the redline object to be integrated into a spatial database using a server and displayed on other maps. The redlining system captures user input and allows for redline objects to be uploaded to a server. Further, the level of sharing on the server side is configurable (e.g., personal, group, global, etc.).

Accordingly, PDA clients can markup the map data that is downloaded with each mapset. The markup graphics elements include a georeferenced polyline redline and a georeferenced text note. The georeferenced polyline redline is a zero width vector that mimics ink flowing from a stylus, and an associated text note that pops up as a tooltip when the object is selected. The georeferenced text note provides text blocks, represented on the map as note symbols anchored at a point, and an associated text note that pops up as a tooltip when the object is selected. Any number of these objects can be included in the markup layer of a specific mapset. Each mapset references a single markup layer.

Markup layers are stored locally and uploaded (synchronized) with the server automatically when the mapset list is updated. The markup layer, being a component of the mapset's data cache, either remains on the client or is purged with the mapset. If the mapset and associated markup layer stay on the client, subsequent edits may be made to it. These edits are copied up to the server at the next synchronization. Once a mapset leaves the PDA device, markup objects leave with it. When the map is accessed again, the note or redline object may or may not be with it, depending on how this map is handled on the server.

General Architecture

Hardware Environment

Figure 1:
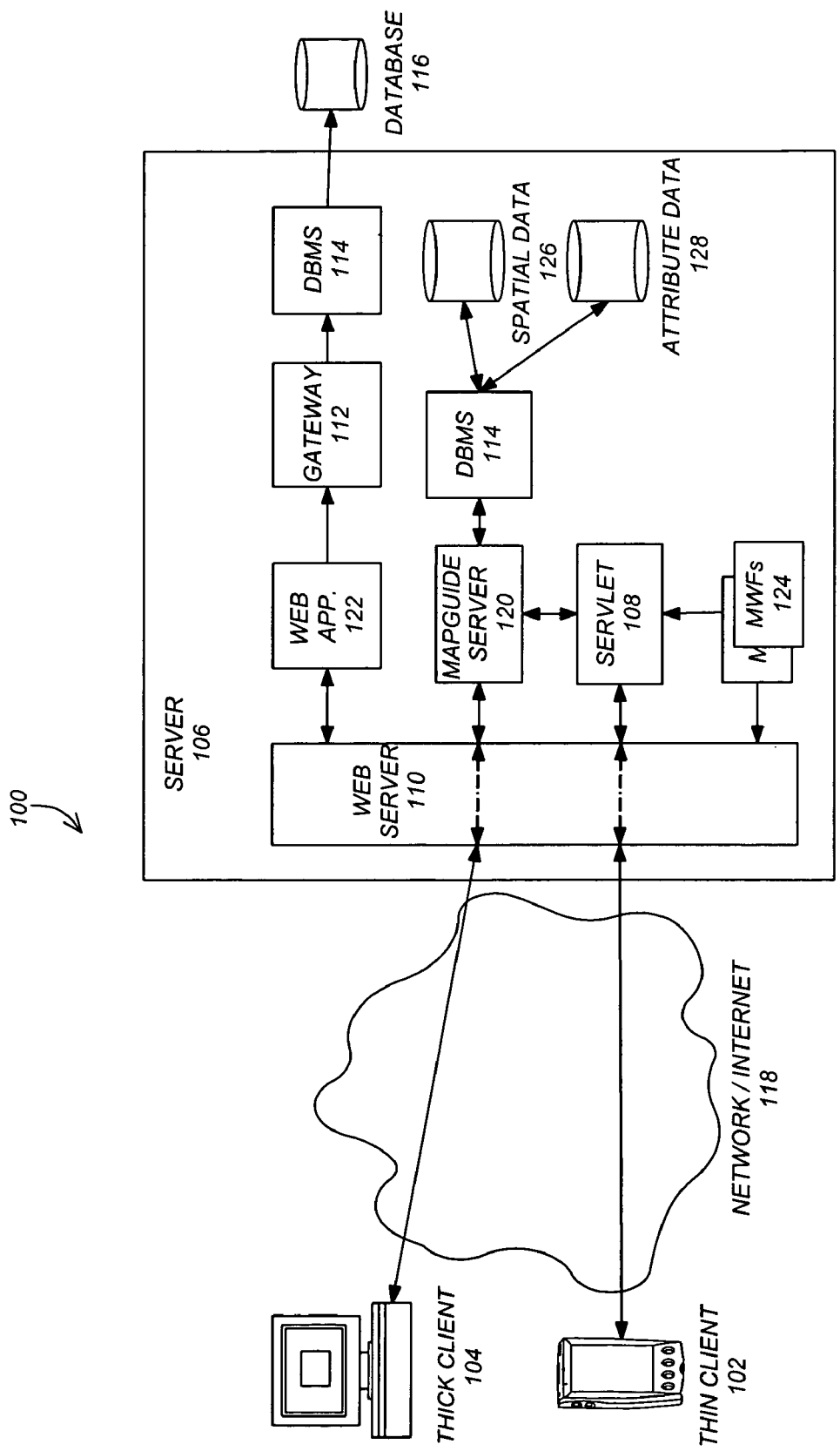
FIG. 1 schematically illustrates a hardware and software environment for the architecture in accordance with one or more embodiments of the invention.

FIG. 1 schematically illustrates a hardware and software environment for the architecture in accordance with one or more embodiments of the invention. A typical distributed computer system 100 uses a network/Internet 118 to connect technicians utilizing clients such as a thin client 102 (e.g. a PDA, WINCE, or PALM device) or a thick client 104 (e.g., a computer system running a browser) to server computers 106.

A thick client 104 as utilized in the existing MAPGUIDE GIS is more fully described in co-pending U.S. patent application Ser. No. 09/411,506, entitled "VECTOR-BASED GEOGRAPHIC DATA", by Gregory A. Roy, et. al., filed on Oct. 4, 1999, which is a continuation patent application of U.S. Pat. No. 5,966,135 issued on Oct. 12, 1999 (application Ser. No. 08/757,706 filed on Oct. 30, 1996), by Gregory A. Roy et al., entitled "VECTOR-BASED GEOGRAPHIC DATA" which application is fully incorporated by reference herein. Such a thick client 104 may comprise a computer with a web browser (enhanced with a plugin or viewer) connected to a web server 110 that communicates with a MapGuide server 120 to retrieve data (e.g., raster data, standard data format (SDF) data 126, attribute data 128, etc.).

A thin client includes three classes of devices: handheld personal computers (HPC), palm-held personal computers (PPC or PDA), and smart phones. Using these devices, a thin client 102 may not provide the full processing and memory capabilities as a thick client 104. For example, as described above with respect to PDAs, thin clients 102 often have memory less than 100K, storage of less than 2–4 MB, processor speeds of 13 MHz, and limited display attributes.

Consequently, additional server 106 side support (e.g., more generalized display data, simplified project files, de-cluttering services, and possibly server management of user state) may be utilized. A typical combination of resources may include a network/Internet 118 comprising the Internet, LANs, WANs, SNA networks, or the like, clients 102 and 104 that are PDAs, personal computers or workstations, and servers 106 that are personal computers, workstations, mini-computers, or mainframes.

The network/Internet 118 connects client computers 102 and 104 executing the appropriate software applications to server computers 106 executing Web servers 110, MapGuide servers 120, and servlets 108. MapGuide servers 120 and servlets 108 may be located within or part of Web server 110. The server 106 and its components may also be referred to as a back office system. Such a back office system maintains access to corporate databases, synchronization utilities, etc. The Web server 110 is typically a program such as IBM's HyperText Transport Protocol (HTTP) Server or Microsoft's Internet Information Server. The servlet 108 communicates with thin client 102 through Web server 110 such that any additional processing required by a thin client 102 may be performed by the servlet 108. The servers 106 also execute a Common Gateway Interface (CGI) 112 (or Netscape Application Programming Interface (NSAPI), Internet Server Application Programming Interface (ISAPI), etc.), which interfaces between the Web server 110 and a database management system (DBMS) 114 that may be utilized to retrieve relevant geographical data (such as SDF data, raster data, Open DataBase Connectivity (ODBC) data, etc.) from database 116.

Generally, components 108–116 and 120–128 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternately, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Software Architecture

In accordance with the hardware descriptions, thick clients 104 are complete computer systems with web browsers and full processing capabilities. However, the hardware limitations of a PDA device necessitate software limitations. Accordingly, to enable a geographic information system and to enable redlining and markup capabilities on a PDA device, a thin client 102 is provided. To accommodate the thin client, additional support on server 106 may be utilized. For example, server 106 may provide for the conversion of data, more generalized display data, simplified project files, de-cluttering services, and possibly server management of the user state.

The architecture of the invention includes a data model that combines static raster layers (static raster data for multiple layers) with live vector objects to deliver good display and download performance, and also provides interactive selectable objects.

Vector based maps (also referred to as "map layer data" consisting of geographic information/data for one or more layers) are served by a servlet 108 and are an encoded and spatially indexed vector representation of the geographic data. Such vector maps provide for a more "interactive" display with flexible zooming on the client 102, highlighting, etc. Alternatively, the Scalable Vector Graphics (SVG) representation as proposed by the WorldWideWeb Consortium (W3C) may be utilized. SVG allows for three types of graphic objects: vector graphic shapes (e.g., paths consisting of straight lines and curves), images, and text. Graphical objects can be grouped, styled, transformed, and composited into previously rendered objects.

A display background (that is raster based) for the geographic data and display layers is managed as a multi-level library of raster tiles. The raster layers are composed from multiple vector layers on servlet 108, resulting in better download and display performance. The raster map on the thin client 102 allows panning (virtual roaming paradigm), and zooming across multiple levels. A smart-cache on thin client 102 allows the swapping of compact tiles from the database to memory, in a manner appropriate to the device. A single workspace per map provides the definition of the map and the display attributes for the layers on the thin client 102.

To view and interact with geographic data on a thin client 102 (such as a PDA), maps from one or more locations and associated attributes are combined into a mapset. The mapset contains the geographic data in a generalized, differentially encoded, indexed vector data. The mapset is transferred from server 106 to thin client 102.

Thin client 102 users (e.g., technicians) can make scribbles and annotations on a map displayed on a thin client using a paper and pencil metaphor. To accommodate such redlining, embodiments provide a redline object that consists of geometric scribbles (points, lines, polygons, symbols), GPS (global positioning system) input coordinates, annotations (positioned text with font information, etc.), and a geo-reference system that allows the redline object to be integrated into a spatial database 116 using server 106 and displayed on other maps. The redlining system captures user input and allows for redline objects to be uploaded to server 106. Further, the level of sharing on the server 106 side is configurable (e.g., personal, group, global, etc.).

Markup data is uploaded from thin client 102 to server 106 for processing the markup data on the server. The processing includes creating an executable that reads a database file containing the markup data (in the form of pixel coordinates) and converts or transforms the pixel coordinates to Mapping Coordinate System (MCS) and Latitude/Longitude (Lat/Lon) coordinates and outputs a standard data format (SDF) file. In the SDF file, point objects represent markup text and polyline objects represent markup redlines. Additionally, the markup data can be geo-referenced on server 106 in a MWF (Map Window File) 124 where the original mapset (that the markup is based on) came from.

Figure 2:
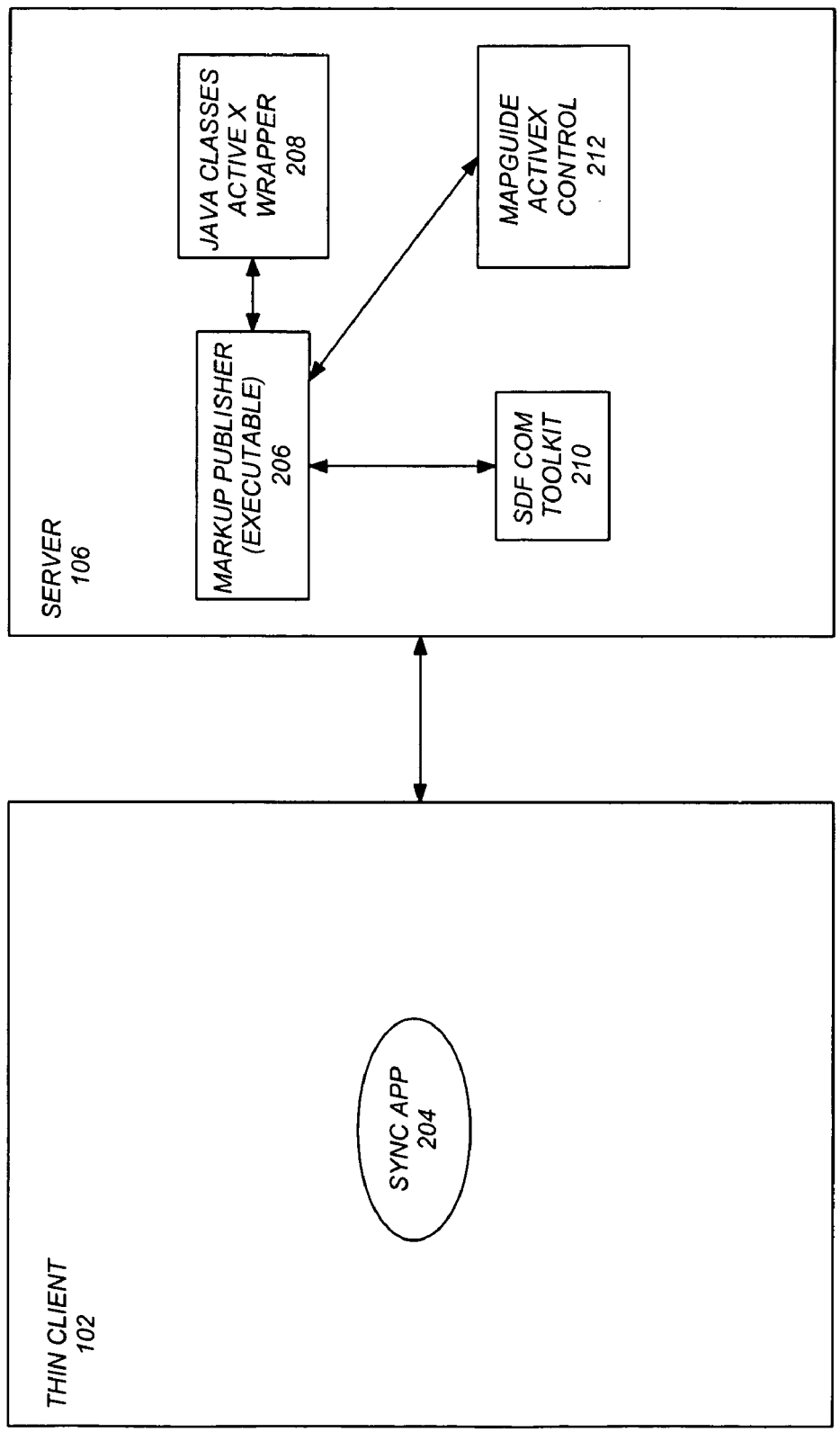
FIG. 2 illustrates a high level architecture that enables redlining and markup processing capabilities in accordance with one or more embodiments of the invention.

FIG. 2 illustrates a high level architecture that enables redlining and markup processing capabilities in accordance with one or more embodiments of the invention. The markup processing design consists of several client 102 and server 106 side components. The main component on the client side 102 is the synchronization application 204 that uploads the markup database (PDB) file from the thin client 102 (e.g., a personal digital assistant (PDA) device). The main component on the server side 106 is the markup publisher executable 206 that utilizes several other components such as some Java classes with an ActiveX wrapper 208, the SDF COM toolkit 210, and MapGuide ActiveX control 212. Each of these components 206–212 may reside within web server 110 and/or as part of components 108, 112–114, and 120–128.

To process thin client 102 markup data, the synchronization application 204 uploads the markup database PDB file from the thin client 102 to the server 106. The file may be uploaded to a "markups" subdirectory within the directory on the server 106 that the mapset was downloaded from. A "markups" subdirectory exists for each user of the system (e.g., within each user id). To upload the PDB file, an HTTP (HyperText Transfer Protocol) "PUT" command may be utilized. A "PUT" command provides for storing an enclosed entity under a specified URI (Uniform Resource Identifier that identifies the resource upon which to apply a request).

Markup Publisher 206 is started on the server 106 and the server 106 administrator loads the markup database PDB file that was just uploaded. From the markup publisher 206, the server 106 administrator runs the markup publisher executable 206 to begin processing the data. The executable 206 makes a call into Java classes with ActiveX Wrapper 208 to convert the pixel data to MCS coordinates. Markup publisher 206 then launches an instance of a MapGuide application (e.g., using MapGuide server 120) with the same map URL (Uniform Resource Locator) where the original mapset data came from. Markup publisher 206 utilizes the instance of the MapGuide application to convert the MCS coordinates to Lat/Lon coordinates. Once the data has been converted to Lat/Lon coordinates, markup publisher 206 uses the SDF COM Toolkit 210 to create an SDF file. The SDF file can be used to superimpose the geo-referenced markup entities on the original MWF 124 map. Appropriate administrator personnel on a thick client 104 or another thin client 102 can then review the markup changes.

Figure 3:
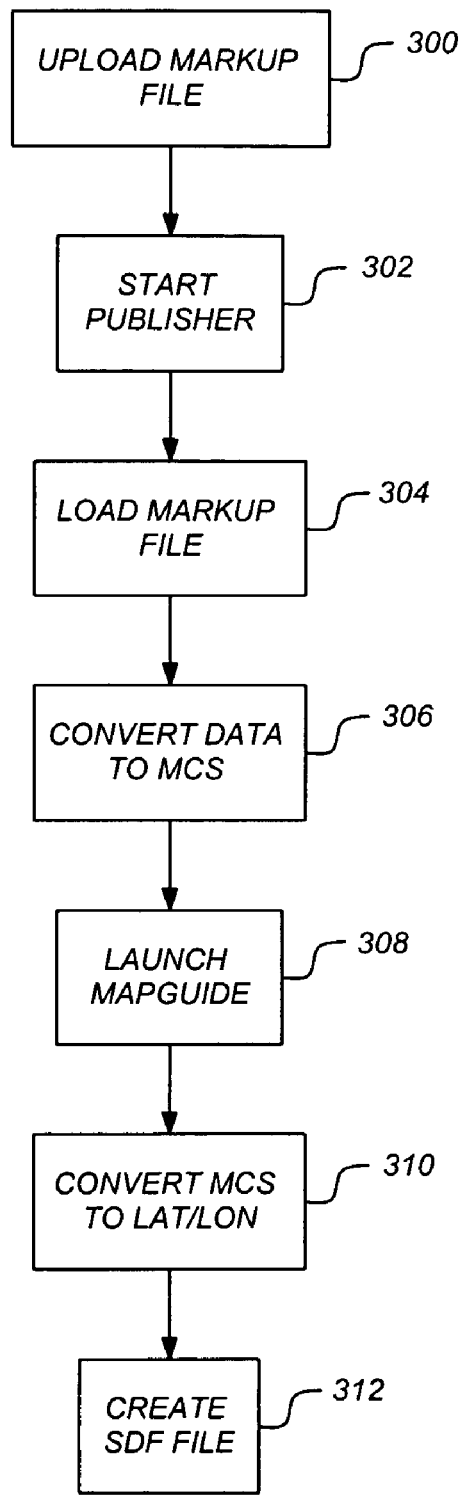
FIG. 3 is a flow chart illustrating the basic data flow for processing personal digital assistant markup data in accordance with one or more embodiments of the invention.

FIG. 3 is a flow chart illustrating the basic data flow for processing thin client 102 markup data as described above. At step 300, the markup database PDB file is uploaded from the thin client 102 to the server 106 using the synchronization application 204. At step 302, the markup publisher 206 is started on the server 106 and at step 304, server 106 loads the markup database PDB file that was just uploaded from thin client 102.

A user (or the markup publisher 206) then initiates a command (by running an executable) to begin processing the data. The command loads the Java classes with ActiveX wrapper 208. At step 306, a call is made from markup publisher 206 to a Java class to read the header and markup data from the PDB file and convert the pixel data to MCS coordinates.

Markup publisher 206 then launches an instance of a MapGuide application (with the same map URL where the original mapset data came from) at step 308. Subsequently, markup publisher 206 may wait for an "onMapLoaded" message to be sent from the MapGuide application. The "onMapLoaded" message indicates when the MCS coordinates have been converted and completed loading. In response to the "onMapLoaded" message, markup publisher 206 reads the MCS coordinates from the Java classes and makes a call to the MapGuide application to convert the MCS coordinates to Lat/Lon coordinates at step 310. The toolkit 210 is then utilized to create and write out the Lat/Lon coordinates to an SDF file at step 312. The SDF file can then be used to superimpose the geo-referenced markup entities on the original MWF map.

As described above, the synchronization application 204 is responsible for uploading markup data from the thin client 102 to server 106. Synchronization application 204 is also responsible for deleting the markup data associated with mapsets that are no longer available on the thin client 102. The markup upload process is intertwined with the mapset download process.

Figure 4:
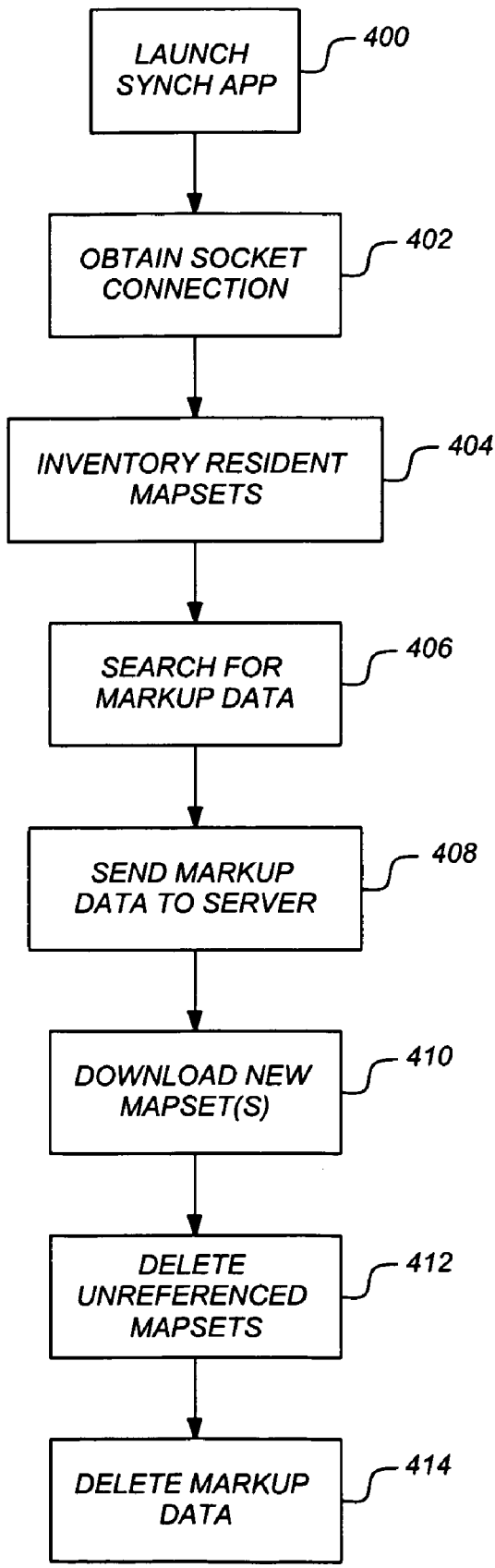
FIG. 4 is a flow chart illustrating a synchronization application markup upload process in accordance with one or more embodiments of the invention.

FIG. 4 is a flow chart illustrating the synchronization application 204 markup upload process. At step 400, a thin client 102 user or application launches the synchronization application 204. At step 402, the synchronization application 204 initiates a socket connection if one is not already open. Synchronization application 204 takes inventory of the mapsets currently resident on thin client 102 at step 404. Synchronization application 204 searches for the markup data associated with the resident mapsets at step 406.

At step 408, synchronization application 204 sends all resident markup data to a specified server 106 directory (e.g., "<server-path>/<username>/markups") using HTTP "PUT" requests. If any of the PUT requests fail, the synchronization operation is terminated and an error message is displayed on the PDA 202. Synchronization application 204 downloads new mapsets at step 410 and deletes unreferenced mapsets at step 412. At step 414, synchronization application 204 deletes any markup data associated with deleted mapsets. Thereafter, synchronization application 204 returns to the calling application or terminates.

Java classes with ActiveX wrapper 208 provide the ability to read header and markup data from the PDB file and the actual markup entities and converting them to MCS coordinates. Additionally, the classes may provide public methods for accessing the data maintained within the classes through a Windows executable via the ActiveX wrapper.

Redline/Markup Features

As described above, thin clients 102 may markup the map data that is downloaded with each mapset. The markup graphics elements include a georeferenced polyline redline and georeferenced text note. The georeferenced polyline redline is a zero width vector that mimics ink flowing from a stylus, and an associated text note that pops up as a tooltip when the object is selected. A tool tip is a small popup window that presents a short description of a toolbar button's purpose when the mouse is positioned over a button for a period of time. The georeferenced text note provides text blocks, represented on the map as note symbols anchored at a point, and an associated text note that pops up as a tooltip when the object is selected. Any number of these objects can be included in the markup layer of a specific mapset. Each mapset references a single markup layer.

Markup layers may be provided in two forms: "correction" and "annotation". The "correction" form shows errors in the underlying map data that require action by the map authors (e.g., if a water main or other device is not located where provided in the map). The "annotation" form is used to record information that augments the map data (e.g., to indicate that a leak or power failure at a specific map location has been fixed). Both forms are stored on the server 106 and are accessible by other map users, but only the "correction" markups are of interest to the map maintainers.

Normally, a user is redlining in "annotation" mode. When a map error is discovered, the user begins a "report map error" process/function. Thereafter, the markup screen is cleared, leaving only the base map. The user then draws markup entities to describe the problem. When finished, the user ends the "report map error" operation, possibly filling out a note/form on the overall map error. The system then returns to the "annotation" mode with all of the previous annotation entries visible.

Redline Object

Figure 5:
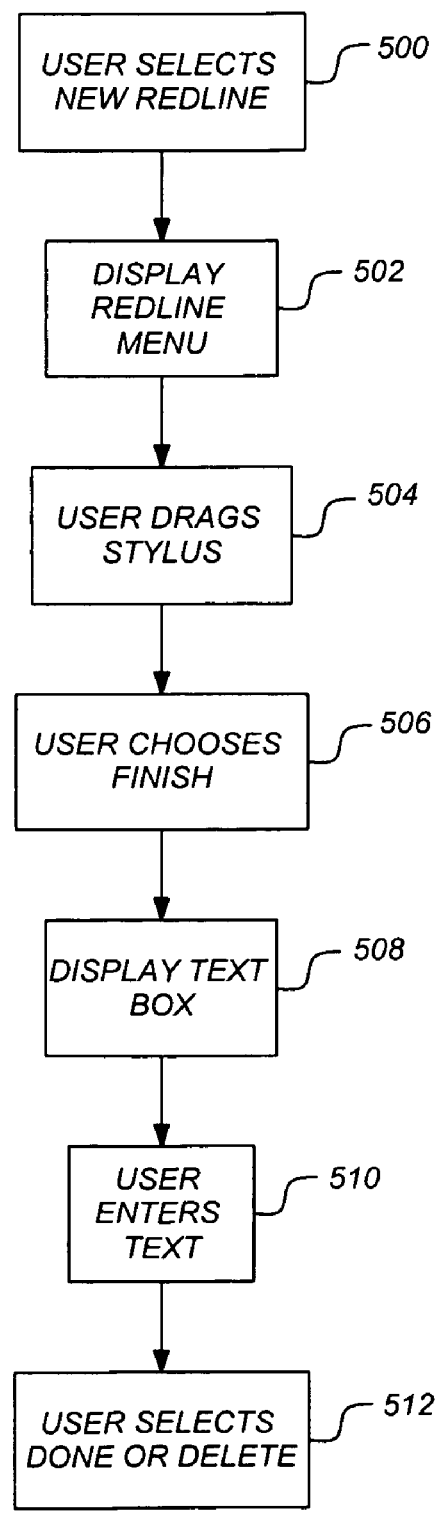
FIG. 5 is a flow chart illustrating the creation of a redline in accordance with one or more embodiments of the invention.
Figure 6A:
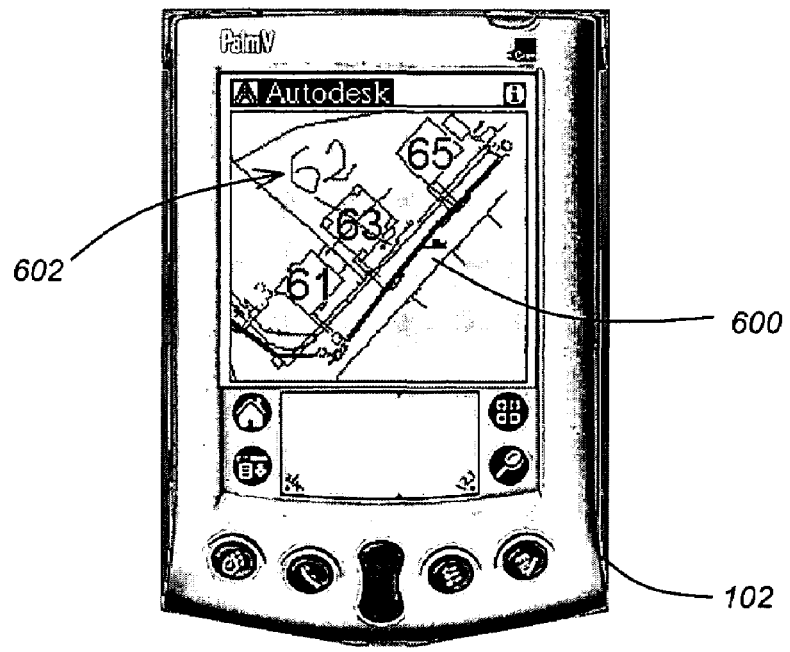
FIG. 6A illustrates a redline object on a personal digital assistant device in accordance with one or more embodiments of the invention.
Figure 6B:
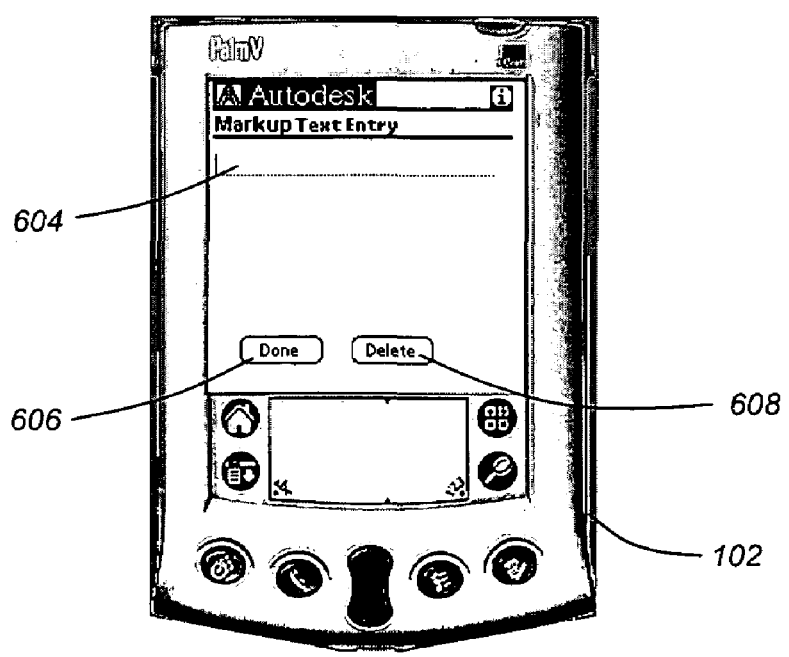
FIG. 6B illustrates a text entry box for a redline object in accordance with one or more embodiments of the invention.

FIG. 6A illustrates a redline object on a thin client 102. FIG. 6B illustrates a text entry box for a redline object. The redline object 602 of FIG. 6A may be created by a user. FIG. 5 is a flow chart illustrating the creation of a redline (e.g., redline object 602) in accordance with one or more embodiments of the invention. The redline process begins when the user is viewing a map (e.g., map 600) on a thin client 102 (e.g., PDA device). At step 500, the user selects a "new redline" map menu choice. Such a menu choice may be activated by selecting a hardware button on a PDA device, by activating a menu using a stylus, or by other common means utilized on a PDA device or thin client 102. At step 502, a redline menu is posted/used. At step 504, the user sketches on the map window 600 of thin client 102. For example, the user can drag the stylus across the screen. A line may continue to track the stylus (within a predetermined tolerance level) so long as the stylus remains in contact with the screen. To complete the redline line, the user can lift the stylus. Thereafter, the user can continue to add to the redline by pressing the stylus to the map window 600 again.

At step 506, the user chooses "finish" from the redline menu to end the redline. Upon selecting "finish", a redline text edit box 604 is displayed at step 508. At the bottom of the redline text edit box are two buttons: "Done" 606 and "Delete" 608. The user enters any desired text at step 510. Once the user has finished entering text, the "Done" button 606 may be selected to complete the creation operation or the "Delete" button 608 can be selected to delete the redline entry at step 512. If the user presses the "Delete" button 608, a confirmation dialog box obtains confirmation/rejection regarding whether the user wants to delete the redline entry. If no text is entered, the default text entry may comprise the text "Note" or the user's name and the date of the entry.

In the creation process, a single "Undo" action may be supported. However, a "redo" command may not be supported. Further, the user may not have the ability to pan or zoom while drawing a redline entry and clipboard text cut/copy/paste functions may not be supported.

To modify an existing redline, the user selects the redline object 602. Thereafter, a tooltip appears with as much of the text as can be shown. If underlined, the text is editable. To access and edit the text, the tooltip is touched again to access text entry screen 604. The user can then edit the text and select "Done" 606 upon completion.

To delete a redline, the user selects the desired redline object 602 on a displayed map 600. The tooltip associated with the selected redline appears underlined, indicating that the tooltip is linked to something. Tapping on the tooltip text displays the redline text edit dialog box 604. The user can tap the delete button 608 in the text entry box 604 to delete the redline.

Markup Note Object

In addition to the redline line as described above, a markup note object may be placed on a map. A markup note object is a symbol that is drawn at the point where the note object is inserted. The size of the symbol is independent of the map scale.

Figure 7:
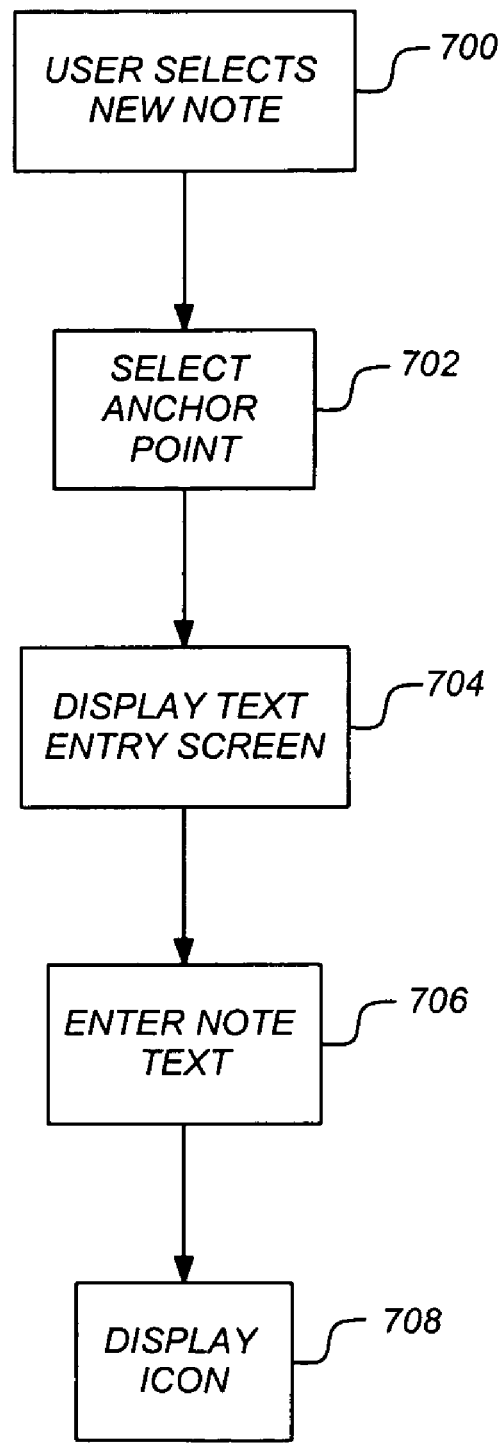
FIG. 7 is a flow chart illustrating the creation of a markup note object in accordance with one or more embodiments of the invention.

FIG. 7 is a flow chart illustrating the creation of a markup note object in accordance with one or more embodiments of the invention. At step 700, the user selects "New Note" from the map menu in the map view screen on thin client 102. Such a menu choice may be activated by selecting a PDA device hardware button, by activating a menu using a stylus, or by other common means utilized on a PDA device or thin client 102. At step 702, the user taps on the screen at a point where the note will be anchored. A text entry screen similar to screen 604 is displayed with "Done" 606 and "Delete" 608 buttons at step 704. At step 706, the user enters the desired text. Memory restrictions may limit the amount of text to 255 characters. Once all of the desired text is entered, the "Done" button 606 is selected. Thereafter, the map view screen 600 is displayed showing an icon at the note anchor point at step 708. Similar to the redline object, a single "undo" action may be supported.

To modify a markup note, the user selects the note icon. Once selected, a tooltip appears with as much of the text as can be shown. If underlined, the text is editable. The user touches the tooltip again to access the text entry screen 604 with the text available for editing. The user can edit the text and selects the "Done" button 606 to finish and update the note text.

To delete a markup note, the user selects the desired markup note icon from map view screen 600. Once selected, a tooltip containing as much of the note text (underlined) as can be displayed appears. The note text is tapped again to gain access to text entry dialog box 604. To delete the markup note, the user merely selects the "Delete" button 608. In response, a confirmation dialog box obtains confirmation/rejection from the user to confirm deletion of the markup note.

Georeferenced Point Symbols

Georeferenced point symbols (predefined custom shapes) are a third type of markup graphic element. Such point symbols are a shorthand annotation system customized to the user application. Each symbol may be optionally associated with a text note. For example, a georeferenced cloud line may be drawn with an associated note text. Such a cloud may be used to call focus to a particular area on the map.

CONCLUSION

This concludes the description of one or more embodiments of the invention. The following describes some alternative embodiments for accomplishing the present invention.

For example, any type of personal digital assistant, WINCE device, etc. can be utilized as a thin client 102. Further, any type of computer, such as a mainframe, mini-computer, or personal computer, or computer configuration, such as a timesharing mainframe, local area network, standalone personal computer, etc. could be used as a server 106.

In summary, a geographic information system on a personal digital assistant or thin client provides the ability to markup or redline a map.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A system for processing markup data for a map on a personal digital assistant comprising:
   (a) a personal digital assistant;
   (b) an application on the personal digital assistant, the application configured to:
      (i) obtain a map as an encoded and spatially indexed vector representation of geographic data from a server;
      (ii) display the map on a screen of the personal digital assistant;
      (iii) obtain markup data comprised of pixel data from a user that utilizes a stylus to markup the map displayed on the personal digital assistant;
      (iv) create a file comprised of the markup data;
      (v) upload the file of markup data from the personal digital assistant to the server.

2. The system of claim 1 wherein the file comprised of markup data is separate from a file of the geographic data.

3. A system for processing mark up data for a map comprising:
   (a) a personal digital assistant, wherein the map comprises an encoded and spatially indexed vector representation of geographic data; and
   (b) an application on the personal digital assistant, the application configured to:
      (i) obtain a file comprised of markup data for a map; and
      (ii) upload the file to a server.

4. The system of claim 3 wherein the markup data comprises pixel data for a markup entity.

5. The system of claim 3 wherein the personal digital assistant obtains the file by obtaining markup data from a user.

6. The system of claim 5 wherein the markup data is a redline line.

7. The system of claim 6 wherein the application configured to obtain the markup data from a user is further configured to:
   (a) determine when a new redline object has been selected; and
   (b) obtain a redline object while a stylus remains in contact with a screen of the personal digital assistant.

8. The system of claim 7, the application configured to obtain further configured to:
   (a) display a text edit dialog box on the screen of the personal digital assistant; and
   (b) accept text user input in the text edit dialog box.

9. The system of claim 5 wherein the markup data is a note.

10. The system of claim 9 wherein the application configured to obtain the markup data from a user is further configured to:
    (a) determine when a new note object has been selected;
    (b) accept a user selection of an anchor point in a display of a map on the personal digital assistant;
    (c) display a text entry screen on the personal digital assistant;
    (d) accept text user input in the text entry screen; and
    (e) display an icon representative of a note at the anchor point.

11. The system of claim 3 wherein the application uploads the data to a server by:
    (a) obtaining a socket connection;
    (b) obtaining an inventory of resident mapsets;
    (c) searching for markup data associated with the resident mapsets; and
    (d) uploading all resident markup data to the server.

12. The system of claim 11 wherein the markup data is uploaded to a server directory on the server using a hypertext transfer protocol PUT request.

13. The system of claim 11, the application on the personal digital assistant further configured to:
    (a) download any new mapsets;
    (b) delete unreferenced mapsets; and
    (c) delete any markup data associated with the deleted mapsets.

14. The system of claim 3 wherein the file comprised of markup data is separate from a file comprised of the map.

15. A system for processing mark up data for a map comprising a server configured to:
    (a) obtain, from a personal digital assistant a file comprised of markup data for a map, wherein the map comprises an encoded and spatially indexed vector representation of geographic data;
    (b) convert the markup data to coordinate data; and
    (c) use the coordinate data to obtain a standard data format (SDF) file that can be used to superimpose the markup data on the map.

16. The system of claim 15 wherein the coordinate data comprises mapping coordinate system (MCS) coordinates and the server is further configured to convert the MCS coordinates to latitude/longitude coordinates.

17. The system of claim 15, wherein the file comprised of markup data is separate from a file comprised of the map.

18. A graphical user interface for obtaining redline markup data for a map on a personal digital assistant, the graphical user interface comprising:
    (a) determining when a new redline object has been selected; and
    (b) obtaining a redline object while a stylus remains in contact with a screen of the personal digital assistant, wherein the map comprises an encoded and spatially indexed vector representation of geographic data.

19. The graphical user interface of claim 18 further comprising:
    (a) displaying a text edit dialog box on the screen of the personal digital assistant; and
    (b) accepting text user input in the text edit dialog box.

20. The graphical user interface of claim 19 further comprising synchronizing the redline markup data with a server.

21. A graphical user interface for obtaining note markup data for a map on a personal digital assistant, the graphical user interface comprising:
    (a) determining when a new note object has been selected;
    (b) accepting a user selection of an anchor point in a display of a map on a personal digital assistant, wherein the map comprises an encoded and spatially indexed vector representation of geographic data,
    (c) displaying a text entry screen on the personal digital assistant;
    (d) accepting text user input in the text entry screen; and
    (e) displaying an icon representative of a note at the anchor point.

22. The graphical user interface of claim 21 further comprising synchronizing the redline markup data with a server.

23. A method for processing mark up data for a map comprising: a server configured to: obtain, from a personal digital assistant, a file comprised of markup data for a map, wherein the map comprises an encoded and spatially indexed vector representation of geographic data; and uploading the file from the personal digital assistant to a server.

24. The method of claim 23 wherein the markup data comprises pixel data for a markup entity.

25. The method of claim 23 wherein the obtaining comprises obtaining markup data from a user.

26. The method of claim 25 wherein the markup data is a redline line.

27. The method of claim 26 wherein the obtaining the markup data from a user comprises:
   (a) determining when a new redline object has been selected; and
   (b) obtaining a redline object while a stylus remains in contact with a screen of the personal digital assistant.

28. The method of claim 27, the obtaining further comprising:
   (a) displaying a text edit dialog box on the screen of the personal digital assistant; and
   (b) accepting text user input in the text edit dialog box.

29. The method of claim 25 wherein the markup data is a note.

30. The method of claim 29 wherein the obtaining the markup data from a user comprises:
   (a) determining when a new note object has been selected;
   (b) accepting a user selection of an anchor point in a display of a map on the personal digital assistant;
   (c) displaying a text entry screen on the personal digital assistant;
   (d) accepting text user input in the text entry screen; and
   (e) displaying an icon representative of a note at the anchor point.

31. The method of claim 23 wherein the uploading the data to a server comprises:
   (a) obtaining a socket connection;
   (b) obtaining an inventory of resident mapsets;
   (c) searching for markup data associated with the resident mapsets; and
   (d) uploading all resident markup data to the server.

32. The method of claim 31 wherein the markup data is uploaded to a server directory on the server using a hypertext transfer protocol PUT request.

33. The method of claim 31 further comprising:
   (a) downloading any new mapsets;
   (b) deleting unreferenced mapsets; and
   (c) deleting any markup data associated with the deleted mapsets.

34. The method of claim 23, wherein the file comprised of markup data is separate from a file comprised of the map.

35. A method processing mark up data for a map comprising:
   (a) obtaining, from a personal digital assistant, a file comprised of markup data for a map, wherein the map comprises an encoded and spatially indexed vector representation of geographic data;
   (b) converting the markup data to coordinate data; and
   (c) using the coordinate data to obtain a standard data format (SDF) file that can be used to superimpose the markup data on the map.

36. The method of claim 35 wherein the coordinate data comprises mapping coordinate system (MCS) coordinates and the method further comprises converting the MCS coordinates to latitude/longitude coordinates.

37. The method of claim 35, wherein the file comprised of markup data is separate from a file comprised of the map.

38. A method for obtaining redline markup data for a map on a personal digital assistant, the method comprising:
   (a) determining when a new redline object has been selected; and
   (b) obtaining a redline object while a stylus remains in contact with a screen of the personal digital assistant, wherein the map comprises an encoded and spatially indexed vector representation of geographic data.

39. The method of claim 38 further comprising:
   (a) displaying a text edit dialog box on the screen of the personal digital assistant; and
   (b) accepting text user input in the text edit dialog box.

40. The graphical user interface of claim 39 further comprising synchronizing the redline markup data with a server.

41. A method for obtaining note markup data for a map on a personal digital assistant, wherein the map comprises an encoded and spatially indexed vector representation of geographic data; the method comprising:
   (a) determining when a new note object has been selected;
   (b) accepting a user selection of an anchor point in a display of a map on a personal digital assistant;
   (c) displaying a text entry screen on the personal digital assistant;
   (d) accepting text user input in the text entry screen; and
   (e) displaying an icon representative of a note at the anchor point.

42. The graphical user interface of claim 41 further comprising synchronizing the redline markup data with a server.

43. An article of manufacture comprising a program storage medium readable by a computer hardware device and embodying one or more instructions executable by the computer hardware device to perform a method for processing markup data for a map, the method comprising:
   obtaining a file comprised of markup data for a map on a personal digital assistant; and
   uploading the file from the personal digital assistant to a server, wherein the map comprises an encoded and spatially indexed vector representation of geographic data.

44. The article of manufacture of claim 43 wherein the markup data comprises pixel data for a markup entity.

45. The article of manufacture of claim 43 wherein the obtaining comprises obtaining markup data from a user.

46. The article of manufacture of claim 45 wherein the markup data is a redline line.

47. The article of manufacture of claim 46 wherein the obtaining the markup data from a user comprises:
   (a) determining when a new redline object has been selected; and
   (b) obtaining a redline object while a stylus remains in contact with a screen of the personal digital assistant.

48. The article of manufacture of claim 47, the obtaining further comprising:
   (a) displaying a text edit dialog box on the screen of the personal digital assistant; and
   (b) accepting text user input in the text edit dialog box.

49. The article of manufacture of claim 45 wherein the markup data is a note.

50. The article of manufacture of claim 49 wherein the obtaining the markup data from a user comprises:
   (a) determining when a new note object has been selected;
   (b) accepting a user selection of an anchor point in a display of a map on the personal digital assistant;
   (c) displaying a text entry screen on the personal digital assistant;

(d) accepting text user input in the text entry screen; and
(e) displaying an icon representative of a note at the anchor point.

51. The article of manufacture of claim 43 wherein the uploading the data to a server comprises:
   (a) obtaining a socket connection;
   (b) obtaining an inventory of resident mapsets;
   (c) searching for markup data associated with the resident mapsets; and
   (d) uploading all resident markup data to the server.

52. The article of manufacture of claim 51 wherein the markup data is uploaded to a server directory on the server using a hypertext transfer protocol PUT request.

53. The article of manufacture of claim 51, the method further comprising:
   (a) downloading any new mapsets;
   (b) deleting unreferenced mapsets; and
   (c) deleting any markup data associated with the deleted mapsets.

54. The article of manufacture of claim 43, wherein the file comprised of markup data is separate from a file comprised of the map.

55. An article of manufacture comprising a program storage medium readable by a computer hardware device and embodying one or more instructions executable by the computer hardware device to perform a method for processing markup data for a map, the method comprising:
   (a) obtaining a file, from a personal digital assistant, comprised of markup data for a map;
   (b) converting the markup data to coordinate data; and
   (c) using the coordinate data to obtain a standard data format (SDF) file that can be used to superimpose the markup data on the map, wherein the map comprises an encoded and spatially indexed vector representation of geographic data.

56. The article of manufacture of claim 55 wherein the coordinate data comprises mapping coordinate system (MCS) coordinates and the method further comprises converting the MCS coordinates to latitude/longitude coordinates.

57. The article of manufacture of claim 55, wherein the file comprised of markup data is separate from a file comprised of the map.

58. An article of manufacture comprising a program storage medium readable by a computer hardware device and embodying one or more instructions executable by the computer hardware device to perform a method for obtaining redline markup data for a map on a personal digital assistant, the method comprising:
   (a) determining when a new redline object has been selected; and
   (b) obtaining a redline object while a stylus remains in contact with a screen of the personal digital assistant, wherein the map comprises an encoded and spatially indexed vector representation of geographic data.

59. The article of manufacture of claim 58, the method further comprising:
   (a) displaying a text edit dialog box on the screen of the personal digital assistant; and
   (b) accepting text user input in the text edit dialog box.

60. The article of manufacture of claim 59, the method further comprising synchronizing the redline markup data with a server.

61. An article of manufacture comprising a program storage medium readable by a computer hardware device and embodying one or more instructions executable by the computer hardware device to perform a method for obtaining redline markup data for a map on a personal digital assistant, wherein the map comprises an encoded and spatially indexed vector representation of geographic data, the method comprising:
   (a) determining when a new note object has been selected;
   (b) accepting a user selection of an anchor point in a display of a map on a personal digital assistant;
   (c) displaying a text entry screen on the personal digital assistant;
   (d) accepting text user input in the text entry screen; and
   (e) displaying an icon representative of a note at the anchor point.

62. The article of manufacture of claim 61, the method further comprising synchronizing the redline markup data with a server.

* * * * *